Nov. 19, 1963   A. R. HOWELL ETAL   3,111,005
JET PROPULSION PLANT

Filed Dec. 28, 1956   6 Sheets-Sheet 1

FIG. I

Alun Raymond Howell
Charles Ernest Moss
Inventors

By Stevens, Davis, Miller & Mosher
their Attorneys

United States Patent Office 3,111,005
Patented Nov. 19, 1963

3,111,005
JET PROPULSION PLANT
Alan Raymond Howell and Charles Ernest Moss, Cove, Farnborough, England, assignors to Power Jets (Research and Development) Limited, London, England, a British company
Filed Dec. 28, 1956, Ser. No. 631,197
Claims priority, application Great Britain Jan. 5, 1956
3 Claims. (Cl. 60—35.6)

This invention relates to gas turbine power plant and particularly though not exclusively to jet propulsion gas turbine engines for aircraft or missiles. When, in a gas turbine power plant, a high effective turbine speed is required a large diameter turbine is frequently employed. If however it is desired to maintain a low overall diameter of power plant as for example in an aircraft, or if the overall diameter of the turbine is necessarily less than that of the compressor, other means must be employed to obtain the desired high effective turbine speed.

The present invention consists in a gas turbine power plant comprising a turbine having two contra-rotating turbine rotors supporting turbine rotor blades, blades on one turbine rotor being in guide blade relationship with blades on the other turbine rotor, a compressor housed in a main gas duct and having two contra-rotating compressor rotors supporting compressor rotor blade rows, each turbine rotor being connected to drive a separate one of said compressor rotors, and a source of high velocity gas independent of atmospheric air arranged to drive the turbine.

The present invention also consists in a gas turbine power plant comprising two contra-rotating turbine rotors and two contra-rotating compressor rotors, each of a diameter greater than that of the turbine rotors, each turbine rotor in driving connection with a separate one of the compressor rotors, a row of turbine rotor blades on one turbine rotor in guide blade relationship with a row of turbine blades on the other turbine rotor, a row of compressor rotor blades on each compressor rotor and a row of compressor stator blades between the two rows of compressor rotor blades.

Contra-rotation of the turbine blading permits a high relative peripheral velocity of the turbine blades to be achieved with a relatively small diameter turbine, and this in turn permits the turbine to be mounted on the inside of the annular main gas flow path through the plant. The compressor is located in the main gas flow path and if the diameter of the compressor is greater than that of the turbine, the compressor blading will normally be subsonic blading and the contra-rotating compressor blade rows will be separated by a row of stator blades to reduce the relative peripheral velocity of the blades. On the other hand the compressor may have adjacent rows of contra-rotating supersonic blading in which case the compressor diameter may be reduced to or below that of the turbine.

The accompanying drawings show six specific embodiments of the present invention applied to a turbo-rocket, that is to say a gas turbine jet propulsion engine in which a turbine, driven by rocket gases, in turn drives a compressor, and air discharged from the compressor together with rocket gases discharged from the turbine, mix and burn in a jet pipe and the final combustion products discharge to atmosphere as a propulsive jet.

FIGURE 1 is a longitudinal sectional view, part in elevation, of a turbo-rocket showing a turbine located to the rear of the compressor in combination with a stationary rocket combustion chamber axially mounted.

In the other views, which are all in longitudinal section with part in elevation, the intake, propulsion nozzle and fuel supply system are omitted since they are substantially as in FIGURE 1.

Figure 1:
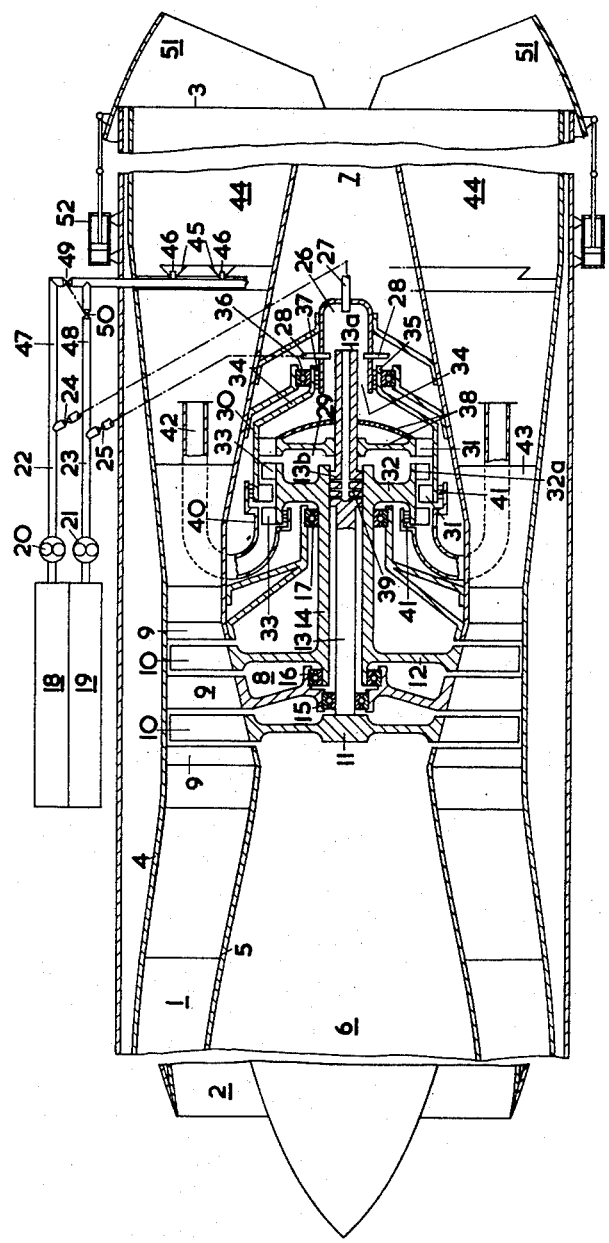

In the specific embodiment shown in FIGURE 1, the turbo-rocket is formed by a main duct 1 having an intake 2 for atmospheric air at its upstream end and a jet propulsion nozzle 3 discharging to atmosphere at its downstream end. The main duct 1 is annular and defined by an outer wall 4, and an inner wall 5 formed at its upstream end by an intake fairing 6 and at its downstream end by an exhaust cone 7. A compressor 8 has two stages of axial flow blading located in the duct, the stator blades 9 being mounted on the outer wall 4 of the duct and the rotor blades 10 on two contra-rotating rotor discs 11, 12, one row of stator blades 9 being interposed between the two rotor blade rows. The compressor rotor discs are carried on two coaxial shafts 13, 14 which are journalled in bearings 15, 16, 17 on the axis of the plant and extend rearwardly of the compressor, the inner shaft 13 supporting the forward rotor disc 11 and the outer shaft 14 supporting the rearward rotor disc 12.

The combustion equipment is arranged on the axis of the plant in the exhaust cone 7 to the rear of the compressor, and fuel is fed to the combustion equipment from rocket fuel tanks 18, 19 through fuel pumps 20, 21 and fuel pipes 22, 23, controlled by valves 24, 25. The rocket fuel tanks 18, 19 will normally contain an oxidant and a hydrocarbon fuel respectively. The combustion equipment comprises a single stationary rocket fuel combustion chamber 26 having an oxidant inlet nozzle 27 and fuel inlet nozzles 28. The combustion chamber 26 discharges forwardly into a turbine 29, arranged on the axis of the plant, which comprises a bell-shaped turbine casing 30 carrying axial flow guide vanes or blades 31 and mounted on the inner shaft 13 for rotation therewith, and a turbine rotor disc 32 carrying axial flow blading 33 and mounted on the outer shaft 14 for contra-rotation with respect to the turbine casing. The turbine casing has an axial inlet 34 for the rocket gases, the casing at the mouth of the inlet having a flange 35 which is journalled in a bearing 36 to provide an end support for the casing, and of which the inner surface engages the combustion chamber outlet through a rotary seal 37. A dome-shaped rotor disc assembly 38 mounted on an extension 13a of the inner shaft and engaging the inner ends of the inlet row of blades 31 around its periphery, is located across the inlet of the casing and serves to direct the axially flowing turbine inlet gases outwardly into the inlet row of turbine blades 31, which constitute turbine inlet guide vanes. A second row of blades 31 is mounted on the turbine casing adjacent its outlet. The rotor disc 32 mounted on the outer shaft 14 carries a peripheral flange 32a on which two rows of the blades 33 are mounted, one row on the downstream side of each row of blades 31. It will be evident that the blades of each turbine blade row (except the last) are in guide blade relationship to the adjacent downstream row of blades.

Adjacent the turbine end of the outer shaft, the inner shaft is enlarged at 13b to bear against the outer shaft through a gas borne bearing 39, the said extension of the inner shaft being hollow and terminating in the rocket combustion chamber so that rocket gas is conducted through the hollow extension into the bearing to constitute the gas affording the bearing. The rocket gases supplied to the bearing must be at a low or medium temperature and may therefore conveniently be substantially pure oxidant.

The turbine discharges forwardly into a stationary manifold 40 which engages the contra-rotating parts of the turbine at the forwardly-facing turbine outlet through two rotating seals 41, the manifold itself discharging into the main duct downstream of the compressor through U shaped outlet pipes 42 which reverse the direction of flow of the gas. The ends of the pipes are supported centrally within the duct by spiders 43.

Downstream of the point at which the manifold outlet pipes discharge into the main duct, the duct is enlarged to form a main combustion chamber 44 in which combustion of the mixture of rocket gas and air may take place. The main combustion chamber is preferably of the ram-jet type containing at its inlet end flame stabilising baffles 45 and is of annular form at least at said inlet end. Since the rocket gas is normally either fuel or oxidant rich, secondary fuel nozzles 46 are provided in the baffles and connected by branch pipes 47, 48 from the pipes 22, 23 for injecting oxidant or additional fuel, as the case may be, into the gas stream to produce a stoichiometric mixture. Fuel flow in the branch pipes 47, 48 is controlled by valves 49, 50, which valves are tied so that only one way may be open at any particular time.

The main combustion chamber discharges to atmosphere through the jet propulsion nozzle 3 which is provided with means by which the nozzle area may be varied, in the form of movable eyelid elements 51 which are operated through pneumatic jacks 52. The nozzle area may alternatively be varied by means of an axially slidable bullet or pod co-operating with a throated portion of the outer casing of the duct.

In a modification of the above-described embodiment, the rocket combustion chamber is formed integral with the turbine casing 30 and is consequently mounted for rotation with the casing in a bearing at the end of the chamber remote from its outlet.

Figure 2:
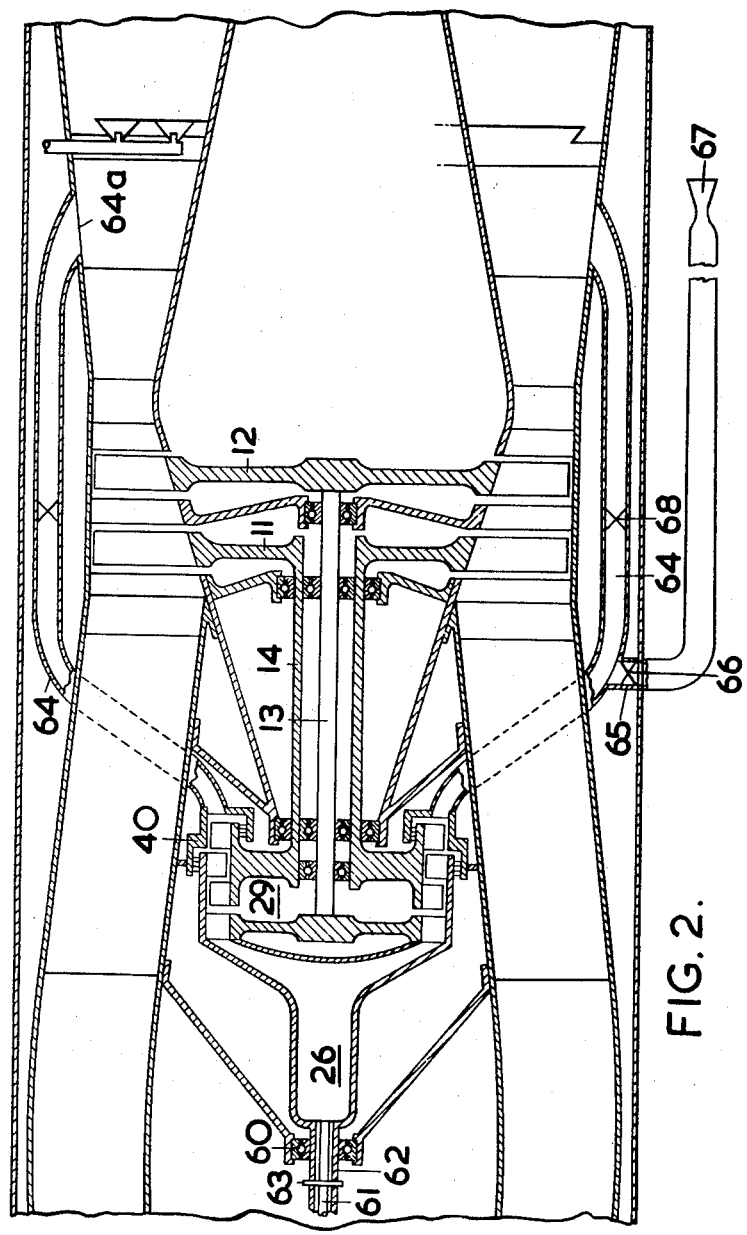
FIGURE 2 shows a turbine located forward of the compressor with a rocket combustion chamber mounted for rotation with a bladed turbine casing.

A second specific embodiment incorporating the above modification is shown in FIGURE 2. The turbine in this case is constructed substantially as described above but is positioned to discharge rearwardly and the combustion chamber 26 which is formed integral with the turbine casing is located on the forward side of the turbine to discharge rearwardly into the turbine. A bearing 60 at the forward end of the combustion chamber, supports the chamber on the axis of the plant. The fuel and oxidant are led into the combustion chamber at this end through coaxial pipes 61, 62 each having a rotary seal 63 located on the axis of the chamber at or near the inlet to the chamber.

The coaxial shafts 13, 14 which support the contra-rotating parts of the turbine and couple each part with one of the compressor rotors, extend rearwardly of the turbine, the forward compressor rotor disc 11 being supported on the hollow outer shaft 14 and the rearward compressor rotor disc 12 being supported on the inner shaft 13.

The turbine outlet manifold 40 is connected to discharge through pipes 64 which extend across the main duct and thence rearwardly to outlets 64a into the main duct downstream of the compressor.

Additional pipes 65 controlled by valves 66 may be connected as branches from pipes 64, each conducting part of the turbine discharge gas direct to a jet propulsion nozzle 67, a valve 68 being connected in each pipe 64 to control the flow distribution. Since discharge of fuel rich gases would be wasteful, this apparatus will normally be used for propulsion purposes only when the turbine discharge gases are oxidant rich.

Figure 3:
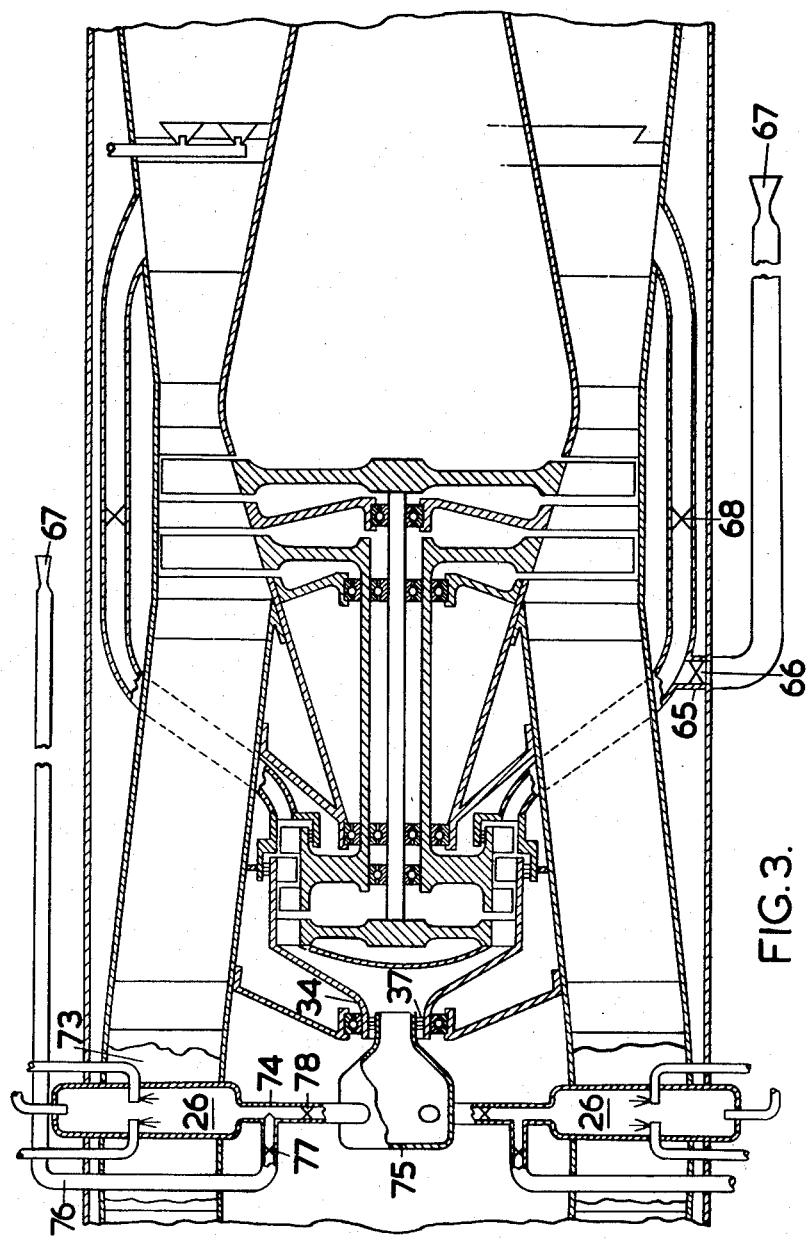
FIGURE 3 shows a turbine located forward of the compressor in combination with a number of individual stationary rocket combustion chambers.

A third specific embodiment shown in FIGURE 3 is a modification of the specific embodiment of FIGURE 2 in which the combustion equipment comprises a number of individual stationary rocket fuel combustion chambers 26 disposed substantially radially of the axis of the plant and housed in spiders 73 which extend across the main duct so that the combustion chambers are accessible from outside the plant for servicing purposes. Transfer pipes 74 extend inwardly from the combustion chambers and discharge tangentially into a stationary manifold 75 located on the axis of the plant immediately in front of the turbine inlet. Branch pipes 76 are each connected to extend direct from one of the combustion chamber transfer pipes to one or more separate jet propulsion nozzles 67, with a valve 77 in each branch pipe to vary or shut-off the rocket gas flow. In addition a valve 78 is connected in each combustion chamber transfer pipe to effect partial admission of the rocket gas to the turbine inlet manifold.

The combustion chamber outlet manifold 75 has a rearwardly facing axial outlet for the rocket gas which is connected to the rotating turbine inlet 34 through a rotary seal 37.

The combustion assembly in this embodiment is also applicable to the specific embodiment shown in FIGURE 1, the single combustion chamber 26 being replaced by a combustion chamber outlet manifold 75 into which individual combustion chambers 26 discharge.

Figure 4:
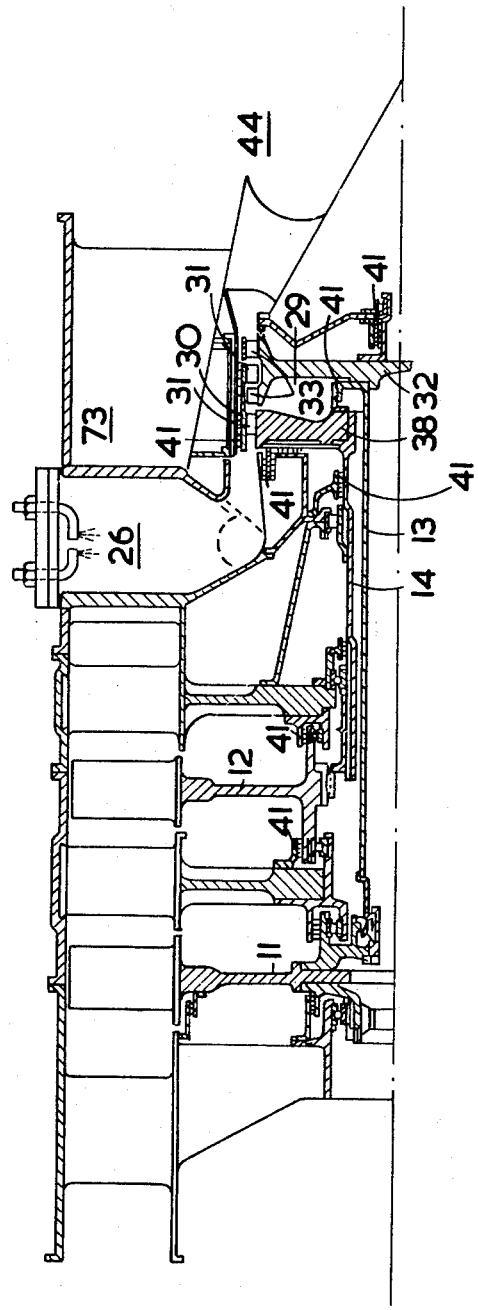
FIGURE 4 shows a turbine located to the rear of the compressor in combination with a number of individual rocket combustion chambers.

A fourth specific embodiment shown in FIGURE 4 is a modification of the embodiment of FIGURE 1 in which the combustion equipment comprises a number of individual stationary rocket fuel combustion chambers 26 disposed substantially radially of the axis of the plant and housed in spiders 73 extending across the main duct. The combustion chambers discharge rearwardly through the turbine 29 into the main combustion chamber 44. In this embodiment, the turbine casing 30 and the rotor disc 38, on which the casing is supported by means of the interposed turbine inlet guide vanes or blades 31, are carried on the outer shaft 14 of the coaxial shafting which also supports and drives the rearward compressor rotor 12. The second turbine rotor disc 32, which carries two rows of rotor blades 33 separated by a second row of blades 31 on the turbine casing, is located to the rear of the turbine rotor disc 38 and is carried on the inner shaft 13 which also supports and drives the forward compressor rotor 11.

Rotary gas seals 41 are interposed between the rotating and stationary parts and between the contra-rotating parts of the plant.

Figure 5:
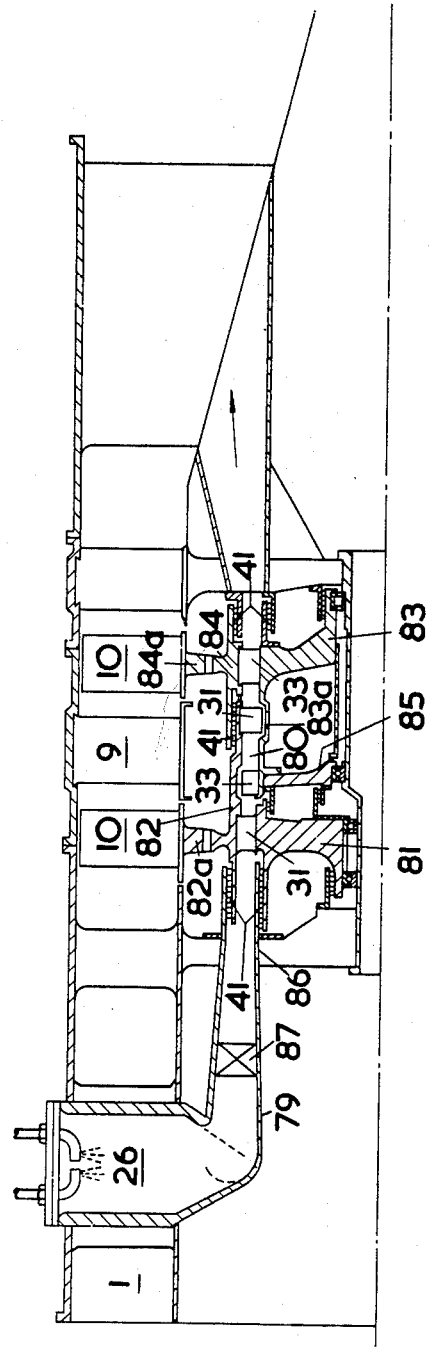
FIGURE 5 shows a combined turbine and compressor assembly in combination with a number of individual rocket combustion chambers.

In the specific embodiment shown in FIGURE 5, individual stationary rocket fuel combustion chambers 26, extending radially with respect to the axis of the plant across the main duct 1, discharge rearwardly through pipes 79 and a manifold 86 into a turbine 80 which is arranged coaxially within the compressor on the axis of the plant. Valves 87 in the pipes 79 may on occasion be closed to obtain partial admission of gas to the turbine. The turbine comprises firstly a forward turbine rotor disc 81 carrying a row of turbine inlet guide vanes or blades 31 surrounded by and supporting an annular shroud 82, elongated in the axial direction, which defines the outer wall of the turbine gas flow path over a major portion of its length, and at its downstream end supports a second row of blades 31, and secondly a rearward turbine rotor disc 83, mounted for contra-rotation with respect to the forward rotor disc 81 and shroud 82, carrying a row of turbine outlet blades 33 surrounded by and supporting an annular shroud 84 elongated in the axial direction, and having an annular extension 83a formed integrally with the forward face of the disc 83 at its periphery which defines the inner wall of the turbine gas flow path over a major portion of its length and carries a row of turbine rotor blades 33 located between the rows of oppositely rotating blades 31. A third turbine rotor disc 85 rotatable with the disc 83 serves to support the upstream end of the extension 83a. Rotary gas seals 41 are interposed between the moving parts of the turbine and the stationary parts of the plant, and between the contra-rotating parts of the turbine.

A radially-extending flange 82a on the turbine rotor shroud 82 supports a forward row of compressor rotor blades 10 located in the main duct 1, and a similar flange 84a on the turbine rotor shroud 84 supports a second row of compressor rotor blades 10 which consequently rotate in the opposite sense with respect to the forward compressor rotor blades. The two rows of compressor rotor blades 10 are separated by a row of compressor stator blades 9.

Figure 6:
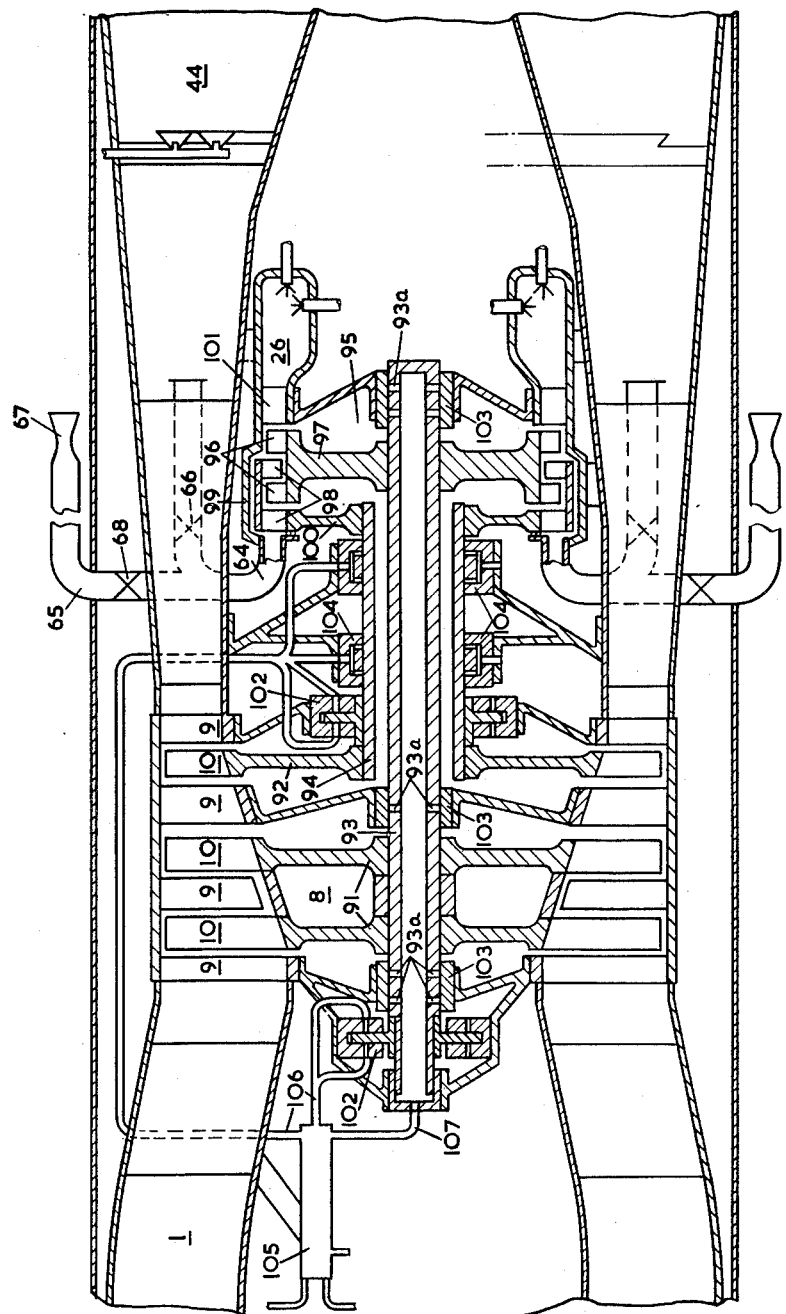
FIGURE 6 shows a modified form of the turbo-rocket of FIGURE 1.

The specific embodiment of FIGURE 6 shows a turbo-rocket having a compressor 8 comprising four rows of compressor stator blades 9 and three rows of compressor rotor blades 10, the first two rows of rotor blades being mounted on rotor discs 91 carried on a hollow shaft 93 and the third row of rotor blades being mounted for rotation in a sense opposite to that of the first two rotor blade rows, on a rotor disc 92 carried on a hollow shaft 94; the shaft 93 passing coaxially through the shaft 94.

The compressor 8 is driven by a turbine 95 which comprises two rows of turbine rotor blades 96 mounted on a rotor disc 97 carried on the rearward end of the inner shaft 93, and, on each side of the downstream row of blades 96, two further rows of turbine rotor blades 98 secured at their radially outer ends to a shroud-like casing 99, the radially inner ends of the downstream row of rotor blades 98 being mounted on a second turbine rotor disc 100 which is carried on the rearward end of the outer shaft 94; the rotor blades 96 and 98 being arranged for contra-rotation with respect to each other, and the blades of each row (except the last downstream row) serving as guide blades with respect to the blades of the adjacent downstream row.

Individual rocket fuel combustion chambers 26 are arranged to the rear of the turbine and discharge forwardly into the turbine through turbine nozzle guide vanes 101 fixedly mounted in the outlet of the chambers. As in the embodiment of FIGURES 2 and 3, the turbine discharges through pipes 64 into the main combustion chamber 44 with branch pipes 65 leading from the pipes 64 direct to separate jet propulsion nozzles 67, valves 68 and 66 being provided in the pipes 64 and 65 respectively to control the flow distribution. If the turbine discharge gases are oxidant rich, a large proportion of these gases may be discharged through the nozzles 67.

Each of the shafts 93, 94, which couple the turbine rotors with the compressor rotors, is provided with a fluid-borne thrust bearing 102 at the forward end of the shaft. The inner shaft 93 is further provided with three fluid-borne journal bearings 103 and the outer shaft with two fluid-borne journal bearings 104. A high pressure gas generator 105, which is connected to supplies of rocket fuel and water, produces as the bearing fluid a low or medium temperature mixture of steam and gas. The gas generator takes the form of a small rocket fuel combustion chamber, arranged to produce gas which is preferably oxidant rich and which is immediately cooled by water injection to the required bearing fluid temperature, the gas so produced being mainly steam. Piping 106 is connected from the gas generator direct to the thrust bearings 102 and the journal bearings 104 of the outer shaft, and further piping 107 is connected from the gas generator to the hollow interior of the inner shaft. Apertures 93a in the wall of the inner shaft conduct the bearing fluid from the interior of the shaft into the bearings 103.

In normal operation of the plant, rocket fuel and oxidant are injected into the combustion chamber or chambers where the mixture burns and discharges a stream of rocket gas which, to avoid excess turbine temperatures, is preferably either oxidant rich or fuel rich. The stream of rocket gas discharges into the turbine and produces contra-rotation of the turbine rotors which in turn drive the compressor rotors. Air drawn in at the intake of the main duct is compressed and discharged from the compressor to mix with the rocket gas discharged from the turbine and the mixture of air and rocket gas with additional fuel or oxidant is burnt in the main combustion chamber and discharged to atmosphere as a jet through the propulsion nozzle 3. If the turbine discharge gases are oxidant rich, part of these gases may be discharged direct to atmosphere through one or more additional propulsion nozzles 67.

It may however on occasion, as for example under cruising conditions, be desired to operate the plant on the ram jet principle. The fuel and oxidant supply to the rocket combustion chamber or chambers in such event is shut off and the main fuel supply is introduced through the secondary nozzles 46 (shown in FIGURE 1) and mixed with ram air to burn in the main combustion chamber. With the turbine inoperative, the compressor is allowed to windmill. To reduce windage losses in the turbine when the compressor rotor is windmilling, the turbine interior may be connected to a region of low pressure so that the turbine blades rotate in a partial vacuum.

Thus there may be a branch pipe such as pipe 65 in FIGURES 2, 3 and 6 leading from each turbine outlet pipe through a valve to an outlet on the surface of the aircraft or missile where, in flight at high altitudes, such a region of low pressure will exist. A non-return valve such as 68 is provided in each turbine outlet pipe downstream of the branch pipe 65. It may further be found desirable to utilise the rotation of the windmilling compressor rotor to drive accessories.

Although only six specific embodiments of the present invention have been described with reference to drawings, it will be clear that the individual feature shown in the drawings together with alternative features mentioned may be combined in various ways to produce a large number of further different embodiments within the present invention.

We claim:

1. A gas turbine jet propulsion power plant comprising a main duct having an air intake from atmosphere at its upstream end and a jet propulsion nozzle open to atmosphere at its downstream end; a dynamic compressor comprising two rotors, two rows of axial flow compressor rotor blades designed for subsonic flow, one row mounted on each rotor, said rows being arranged in series flow relationship in said duct to compress the airflow therein and being designed for contra-rotation with respect to one another, and a row of axial flow compressor stator blades interposed in series flow relationship between said compressor rotor blade rows; a secondary duct separate from said main duct and having an outlet into said main duct downstream of the compressor; a source of supply of high velocity gas independent of atmospheric air connected to discharge through said secondary duct and outlet into said main duct; a turbine comprising two rows of axial flow turbine blades, said rows being designed for contra-rotation with respect to and arranged in guide blade relationship with one another in said secondary duct to be driven by said high velocity gas, the tip diameter of said turbine rotor blade rows being less than the tip diameter of said compressor rotor blade rows; and coupling means connecting each turbine rotor blade row to drive a separate one of said compressor rotors to rotate therewith in the same sense and at the same rotational speed.

2. Plant according to claim 1 wherein the source of supply of high velocity gas comprises rocket-type combustion chamber means closed to atmospheric air, and means for continuously supplying rocket fuel to said combustion chamber means for combustion therein.

3. A gas turbine power plant comprising a compressor including two rotors, two rows of axial flow compressor rotor blades designed for subsonic flow, one row mounted on each rotor and said rows being arranged in series flow relationship and designed for contra-rotation with respect to one another, and a row of axial flow compressor stator blades interposed in series flow relationship between said compressor blade rows; a turbine including two rows of axial flow rotor blades, said rows being arranged in guide relationship with and designed for contra-rotation with respect to one another, the tip diameter of said turbine rotor blade rows being less than the tip diameter of said compressor rotor blade rows; combustion chamber means connected to supply combustion gases to drive said turbine rotor blades; and coupling means connecting each turbine rotor blade row to drive a separate one of said compressor rotors to rotate therewith in the same sense and at the same rotational speed.

References Cited in the file of this patent

UNITED STATES PATENTS

| | | |
|---|---|---|
| 2,360,130 | Heppner | Oct. 10, 1944 |
| 2,505,660 | Baumann | Apr. 25, 1950 |
| 2,526,223 | Goddard | Oct. 17, 1950 |
| 2,585,626 | Chilton | Feb. 12, 1952 |
| 2,608,821 | Hunsaker | Sept. 2, 1952 |
| 2,625,790 | Petrie | Jan. 20, 1953 |
| 2,659,528 | Price | Nov. 17, 1953 |
| 2,676,456 | Holzwarth | Apr. 27, 1954 |
| 2,689,681 | Sabatiuk | Sept. 21, 1954 |
| 2,756,115 | Michel | July 24, 1956 |
| 2,801,789 | Moss | Aug. 6, 1957 |
| 2,812,898 | Buell | Nov. 12, 1957 |
| 2,857,740 | Hall et al. | Oct. 28, 1958 |
| 2,937,491 | Howell | May 24, 1960 |

FOREIGN PATENTS

| | | |
|---|---|---|
| 126,578 | Australia | Jan. 15, 1948 |
| 704,669 | Great Britain | Feb. 24, 1954 |